US010715817B2

(12) United States Patent
He (10) Patent No.: US 10,715,817 B2
(45) Date of Patent: Jul. 14, 2020

(54) APPARATUS AND METHOD FOR ENHANCING MOTION ESTIMATION BASED ON USER INPUT

(71) Applicant: NVIDIA Corporation, Santa Clara, CA (US)

(72) Inventor: Helix He, Shanghai (CN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/719,753

(22) Filed: Dec. 19, 2012

(65) Prior Publication Data
US 2014/0169471 A1   Jun. 19, 2014

(51) Int. Cl.
*H04N 7/00*      (2011.01)
*H04N 19/162*    (2014.01)
*H04N 19/56*     (2014.01)
*H04N 19/61*     (2014.01)

(52) U.S. Cl.
CPC .......... *H04N 19/162* (2014.11); *H04N 19/56* (2014.11); *H04N 19/61* (2014.11)

(58) Field of Classification Search
CPC ............................................... H04N 19/00569
USPC ..................................... 375/240.16
See application file for complete search history.

(56) References Cited

U.S. PATENT DOCUMENTS

| 5,563,813 | A  | * | 10/1996 | Chen ...................... H04N 5/145 348/E5.066 |
| 6,113,494 | A  | * | 9/2000  | Lennert ................... A63F 13/12 463/31 |
| 6,507,349 | B1 | * | 1/2003  | Balassanian ........ G06F 3/04812 345/440.1 |
| 6,546,441 | B1 | * | 4/2003  | Lum ..................... G06Q 20/20 705/16 |
| 2003/0112873 | A1 | | 6/2003 | Demos |

(Continued)

FOREIGN PATENT DOCUMENTS

| CN | 1925617 | 3/2007 |
| CN | 101072364 | 11/2007 |

(Continued)

OTHER PUBLICATIONS

Patent Application as Filed Dated Mar. 29, 2006; U.S. Appl. No. 11/394,031.

(Continued)

*Primary Examiner* — Jonathan R Messmore
(74) *Attorney, Agent, or Firm* — Shook, Hardy & Bacon, L.L.P.

(57) ABSTRACT

A method and apparatus for enhancing motion estimation based on user input are provided. The motion estimation apparatus used for video encoding comprises a receiver operable to receive a user based input and an input analysis module operable to analyzed the user based input. The apparatus also comprises an encoder that is operable to compute displacement coordinates from the analyzed user based input for a current block in a target frame of a video stream and operable to determine a search area in a reference frame to search for a best match for the current block using the displacement coordinates. The encoder can also comprise a block match module operable to find a best match block for the current block in the search area of the reference frame using a block matching procedure.

22 Claims, 8 Drawing Sheets

(56) References Cited

U.S. PATENT DOCUMENTS

| | | | |
|---|---|---|---|
| 2003/0185303 A1* | 10/2003 | Hall et al. | 375/240.16 |
| 2004/0247029 A1 | 12/2004 | Zhong et al. | |
| 2005/0104889 A1* | 5/2005 | Clemie et al. | 345/522 |
| 2009/0199128 A1* | 8/2009 | Matthews et al. | 715/799 |
| 2011/0200107 A1* | 8/2011 | Ryu | H04N 19/61 |
| | | | 375/240.16 |

FOREIGN PATENT DOCUMENTS

| | | |
|---|---|---|
| CN | 102750079 | 10/2012 |
| TW | 201215155 | 4/2012 |
| TW | I393864 | 4/2013 |

OTHER PUBLICATIONS

Patent Application as Filed Dated Jun. 20, 2007; U.S. Appl. No. 11/821,069.

* cited by examiner

APPARATUS AND METHOD FOR ENHANCING MOTION ESTIMATION BASED ON USER INPUT

FIELD OF THE INVENTION

Embodiments according to the present invention generally relate to video coding techniques and more specifically to motion estimation techniques used in video coding.

BACKGROUND OF THE INVENTION

Digital video takes up a significant amount of storage space or bandwidth in its original uncompressed form. Video coding or video compression is the process of compressing (encoding) and decompressing (decoding) video. Video compression makes it possible to transmit or store digital video in a smaller, compressed form. Many video compression standards, including MPEG-2, MPEG-4 and H.264, are well-known in the art today and provide efficient methods to compress video data.

These standards use a variety of compression techniques, including inter frame prediction. Inter frame prediction (or inter frame coding) is based on the premise that in most video scenes, the background remains relatively stable while action is taking place in the foreground. Thus, typically video images vary little over short durations of time. As such, a significant part of the video information in a stream of images is predictable and therefore redundant. Accordingly, a primary objective of the inter frame prediction technique is to remove the redundant information in a video stream comprising one or more neighboring frames and leave only the true or unpredictable information. Inter frame prediction, therefore, takes advantage of the temporal redundancy between neighboring frames in order to attain higher compression rates.

Rather than storing separate, complete images for every frame of video then, most video compression standards use inter frame prediction, which comprises providing one or more reference frames, and building the majority of frames by noting how the reference frames change. For example, in some of the more popular video compression standards, a single complete image is encoded at the beginning of a sequence; such a complete image is described as an intra frame (I frame). The I frame is a reference frame. It is compressed without reference to other frames and thus contains an entire frame of video information. As a result, it can be decoded without any additional information. In most video compression standards, there are two other types of inter-frames also used: P frames and B frames.

Predicted frames (or P frames) generally are encoded with reference to a past frame (either an I frame or a previous P frame) and in general are used as a reference for subsequent P frames. B frames provide higher compression than P frames but require both a past and a future reference frame in order to be encoded.

Typically, an I frame needs to be transmitted periodically so that the decoder can synchronize to the video stream, otherwise it would be impossible to obtain the reference images. Since the images in between the reference I frames typically vary only to a small degree, only the image differences in the form of P frames and B frames, are captured, compressed and stored. How well a video compression technique performs depends largely on the accuracy of its estimate of these differences.

When a stream of video frames involves a moving object, the estimate needs to also include motion compensation. To this end, each inter coded frame is divided into blocks known as macroblocks. Typically, each frame can be subdivided into either 16×16 blocks or 8×8 blocks, however, different encoding techniques use different block partitioning techniques. Macroblocks are regions of image pixels.

In conventional systems, instead of directly encoding raw pixel values for each block, the encoder tries to find a block similar to the one it is encoding on a previously encoded frame, typically the reference frame. This process is done by a block matching procedure, which is a motion-compensated estimation technique most commonly used in conventional systems because its consistency and simplicity make it considerably suitable for hardware implementation. If the encoder finds a match, the block could be encoded by a vector known as motion vector, which points to the position of the matching block at the reference frame. Accordingly, motion vectors are simply displacements measurements of objects between successive video frames and are transmitted as part of the compression scheme to be used in decoding the compressed video frame.

The process used to determine motion vectors is called motion estimation. Applying the motion vectors to an image to synthesize the transformation to the next image is called motion compensation. The combination of motion estimation and motion compensation is an integral part of many well-known video compression protocols.

In most cases, the encoder will succeed in finding a match on the reference frame. However, the block found is not likely to be an exact match to the block it is encoding and, as a result, the encoder will compute the differences between the two blocks. These differences are known as a prediction error and are transformed and sent to the decoder along with the motion vector. The decoder uses both the motion vector pointing to the matched block and the predictor error to recover the original block.

Figure 1:
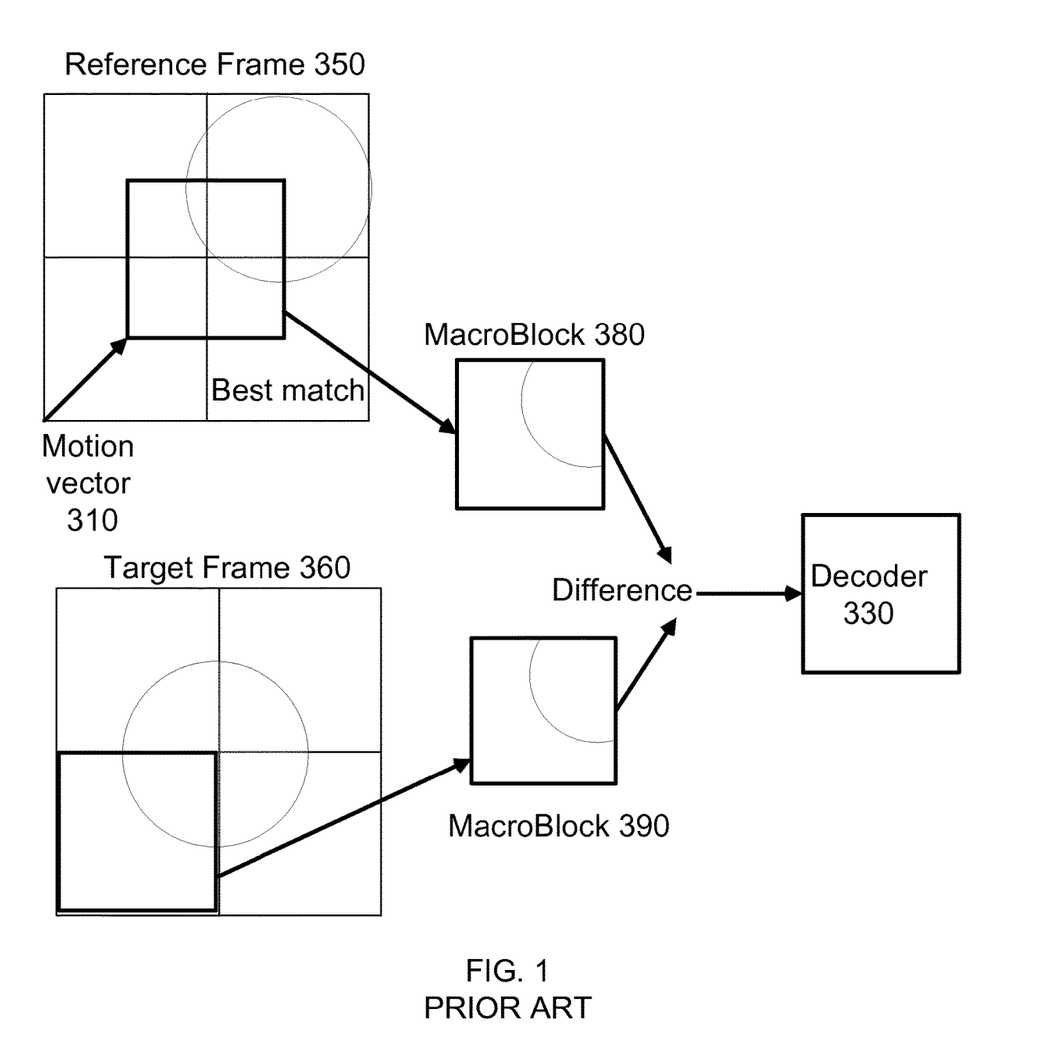
FIG. 1 illustrates an exemplary prior art technique of implementing inter-frame prediction.

FIG. 1 illustrates how a prior art inter-frame prediction process is carried out. Instead of encoding the raw pixel values for macroblock 390 in target frame 360, the encoder uses a block matching procedure to try and find a block similar to it in reference frame 350. After finding macroblock 380 in the reference frame 350 and identifying it as the best match, the encoder will generate a motion vector 310 for macroblock 390 under the assumption that all the pixels within that block have the same motion activity. The block 380 in reference frame is identified through a search based on a best match selection criteria relative to a block from the target frame 360. The best match selection criteria is typically designed to ensure a minimized estimation difference (or prediction error).

The encoder will then compute the difference between macroblock 380 and macroblock 390 and transmit the calculated prediction error along with the computed motion vector 310 to the decoder 330. Using both the prediction error and the computed motion vector, the decoder can then recover macroblock 390.

Conventional systems employ many types of block matching procedures to find best matches that result in the smallest prediction error between block 390 from the target frame 360 and block 380 located from a search area within the reference frame 350. The most effective search but also the most inefficient and computationally expensive is a full exhaustive search wherein every block within the search area of the reference frame is examined and the corresponding computation made. The match selection criterion used for the full search may be the Sum of Absolute Difference (SAD), but other match selection criteria including mean absolute difference, mean square difference, etc., can also be used.

In order to reduce inefficiencies and processing effort and times, other search techniques have also been developed, including, cross search, spiral search, three step search, four step search, orthogonal search, hierarchical search and diamond search, for instance. These procedures attempt to equal the quality of an exhaustive search without the attendant time and computation effort. However, all such high speed methods of motion estimation are subject to certain shortcomings.

One shortcoming of conventional motion estimation methods is that these techniques use block matching procedures that start searching in the reference frame for a best match block at the same position that the block to be encoded (current block) holds in the corresponding target frame. Some procedures incorporate positions corresponding to neighboring blocks in the search for the current block within the reference frame as well. However, in real time encoding where significant transitions are occurring in the video frames over a short period of time, the encoder may not be able to find the best matching block in time if precious computational time is spent in searching the reference frame for the current block around the same position that it holds in the target frame. This makes it difficult to ensure real-time transmission of encoded video data.

BRIEF SUMMARY OF THE INVENTION

With the advent of cloud computing, remote desktop computing and wireless display transmissions and other applications requiring display of screen updates based on user inputs in real time over the Internet or an Intranet, more efficient and less complex compression procedures are required because these applications require transmission of highly complex video images that change very rapidly. For example, users playing video games rendering three-dimensional graphics with each other over a local area network or the Internet requires transmission of the user inputs to the application server and the resultant video images downstream to the user terminal from the application server in real time. The processing for encoding large amounts of video data in such applications requires a considerable amount of time with conventional encoding techniques.

Accordingly, a need exists for a more robust best-match block finding technique that can address the problems with the systems described above. Using the beneficial aspects of the systems described, without their respective limitations, embodiments of the present invention provide a novel solution to address these problems.

Embodiments of the invention provide methods and systems for performing motion estimation more efficiently by using a best-match block finding technique during real time video encoding that uses user inputs as cues. More specifically, embodiments of the invention use user inputs as cues for finding a best match block in the reference frame so that the procedure does not need to start the search in the reference frame at or around the same position corresponding to the current block in the target frame.

In one embodiment, an apparatus for enhancing motion estimation based on user input is provided. The motion estimation apparatus used for video encoding comprises a receiver operable to receive a user based input and an input analysis module operable to analyze the user based input. The apparatus also comprises an encoder that is operable to compute displacement coordinates from the analyzed user based input for a current block in a target frame of a video stream and operable to determine a search area in a reference frame to search for a best match block for the current block using the displacement coordinates. The encoder can also comprise a block match module operable to find a the best match block for the current block in the search area of the reference frame using a block matching procedure.

In another embodiment, a method of motion estimation during video encoding is provided. The method comprises receiving and analyzing a user based input. Further, the method comprises computing displacement coordinates from the analyzed user based input for a current block in a target frame of a video stream. Next, the method comprises determining a search area in a reference frame to look for a best match block corresponding to the current block using the displacement coordinates. The method can also comprise finding a best match block for the current block in the search area of the reference frame using a block matching procedure.

In one embodiment, a computer system comprising a central processing unit and a graphics processing system coupled to the CPU is provided. The graphics process system comprises a graphics processing unit (GPU) operable as a plurality of virtual GPUs that are concurrently utilized by a plurality of applications executing in parallel. The system also comprises a communication interface operable for sending and receiving data and a memory coupled to the graphics processing system and having stored therein instructions that, if executed by the computer system, cause the computer system to execute operations comprising: (a) accessing first user input received from an independent first client device via the communication interface, wherein the first user input is associated with a first application of the plurality of applications, (b) generating displacement coordinates for a current block in a target frame of a video stream corresponding to the first application based on an analysis of said first user input; (c) determining a corresponding search area in a reference frame for a plurality of blocks in the target frame based on the displacement coordinates; and (d) determining a best match block for the plurality of blocks in the corresponding search area in the reference frame using a block matching procedure.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follows are presented and discussed in terms of a process or method. Although steps and sequencing thereof are disclosed in figures (e.g. FIG. 7) herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "allocating," "associating," "moving," "copying," "setting," "accessing "controlling," "computing", "adding," "recording," "determining," "identifying," "caching," "maintaining," "incrementing," "comparing," "removing," "generating," "reading," "writing," "transmitting," "receiving," or the like, refer to actions and processes of a computer system (e.g., flowchart 700 of FIG. 7) or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Further, while embodiments described herein may make reference to a GPU, it is to be understood that the circuits and/or functionality described herein could also be implemented in other types of processors, such as general-purpose or other special-purpose coprocessors, or within a CPU.

Apparatus and Method for Enhancing Motion Estimation Based on User Input

Figure 2:
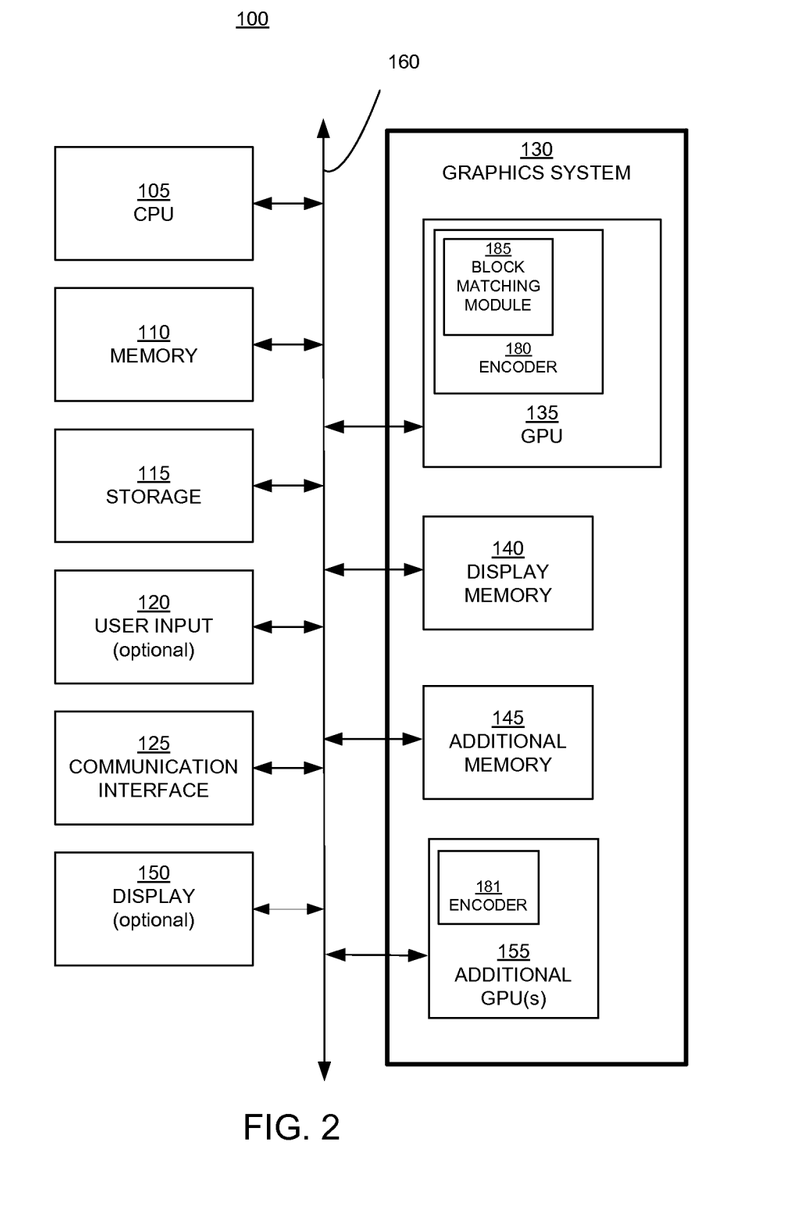
FIG. 2 is a block diagram of an example of a server computer system upon which embodiments of the present invention may be implemented.

FIG. 2 is a block diagram of an example of a computer system 100 capable of implementing embodiments according to the present invention. In one embodiment, an application server as described herein may be implemented on exemplary computer system 100.

In the example of FIG. 2, the computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including an Intranet or the Internet. In one embodiment, the computer system 100 receives instructions and user inputs from a remote computer through communication interface 125. Communication interface 125 can comprise a transmitter and receiver for communicating with remote devices.

The optional display device 150 may be any device capable of displaying visual information in response to a signal from the computer system 100.

The components of the computer system 100, including the CPU 105, memory 110, data storage 115, user input devices 120, communication interface 125, and the display device 150, may be coupled via one or more data buses 160.

In the embodiment of FIG. 2, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands. As discussed further in conjunction with FIG. 3, the physical GPU 135 can be configured as multiple virtual GPUs that may be used in parallel (concurrently) by a number of applications executing in parallel.

Graphics system 130 may also comprise an encoder 180 in one embodiment. The encoder 180 may be any device capable of encoding (compressing) data, such as video data in accordance with the principles of this invention. The encoded data can then be transmitted to a client device using communication interface 125. The encoder 180 comprises a block matching module 185 which implements the procedure and performs the computations necessary to find a best match for a macroblock of a target frame in the reference frame of a sequence of video frames generated by the GPU.

Graphics memory may include a display memory 140 (e.g., a framebuffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications executing in parallel. Each additional GPU 155 can operate in conjunction with the GPU 135 to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 3:
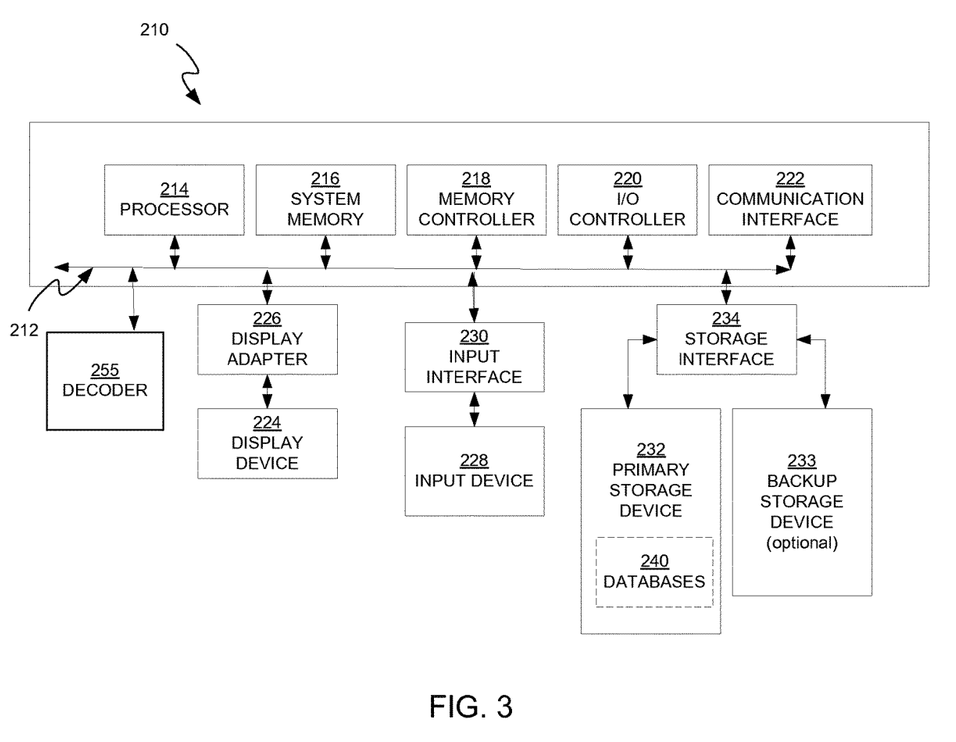
FIG. 3 is an exemplary end user or client device upon which embodiments of the present invention may be implemented.

FIG. 3 is a block diagram of an example of an end user or client device 210 capable of implementing embodiments according to the present invention. Computing system 210 broadly represents any single or multi-processor computing device or system capable of executing computer-readable instructions. Examples of computing system 210 include, without limitation, workstations, laptops, client-side terminals, televisions, handheld devices (e.g. cellphones, PDAs etc.), or any other personal computing system or device.

Further example of computing system 210 include set-top video game console devices such as, for example, the Xbox® available from Microsoft Corporation of Redmond, Wash. or the PlayStation® available from Sony Computer Entertainment Corporation of Tokyo, Japan. System 210 can also be implemented as a "system on a chip", where the electronics (e.g., the components 214, 216, 218, 220, 222 and the like) of a computing device are wholly contained within a single integrated circuit die. Examples include a hand-held instrument with a display, a car navigation system, a portable entertainment system, and the like.

In its most basic configuration, computing system 210 may include at least one processor 214 and a system memory 216. Relative to computer system 100, the client device 210 in the example of FIG. 3 can have fewer components and less functionality and, as such, may be referred to as a thin client. In another embodiment, the client device can be a simple display device such as a television or a user terminal, where all the processing is performed on the device that the client device is connected to and the client device simply displays images relayed over from the other device.

Processor 214 generally represents any type or form of processing unit capable of processing data or interpreting and executing instructions. In certain embodiments, processor 214 may receive instructions from a software application or module. These instructions may cause processor 214 to perform the functions of one or more of the example embodiments described and/or illustrated herein.

System memory 216 generally represents any type or form of volatile or non-volatile storage device or medium capable of storing data and/or other computer-readable instructions. Examples of system memory 216 include, without limitation, RAM, ROM, flash memory, or any other suitable memory device. Although not required, in certain embodiments computing system 210 may include both a volatile memory unit (such as, for example, system memory 216) and a non-volatile storage device (such as, for example, primary storage device 232).

Computing system 210 may also include one or more components or elements in addition to processor 214 and system memory 216. For example, in the embodiment of FIG. 3, computing system 210 includes a memory controller 218, an input/output (I/O) controller 220, and a communication interface 222, each of which may be interconnected via a communication infrastructure 212. Communication infrastructure 212 generally represents any type or form of infrastructure capable of facilitating communication between one or more components of a computing device. Examples of communication infrastructure 212 include, without limitation, a communication bus (such as an Industry Standard Architecture (ISA), Peripheral Component Interconnect (PCI), PCI Express (PCIe), or similar bus and a network.

Memory controller 218 generally represents any type or form of device capable of handling memory or data or controlling communication between one or more components of computing system 210. For example, memory controller 218 may control communication between processor 214, system memory 216, and I/O controller 220 via communication infrastructure 212.

I/O controller 220 generally represents any type or form of module capable of coordinating and/or controlling the input and output functions of a computing device. For example, I/O controller 220 may control or facilitate transfer of data between one or more elements of computing system 210, such as processor 214, system memory 216, communication interface 222, display adapter 226, input interface 230, and storage interface 234.

Communication interface 222 broadly represents any type or form of communication device or adapter capable of facilitating communication between example computing system 210 and one or more additional devices. For example, communication interface 222 may comprise a transmitter and a receiver and facilitate communication between computing system 210 and a private or public network including additional computing systems. In one embodiment, communication interface 222 is used to communicate with an application server executing an application such as a video game in the cloud.

Examples of communication interface 222 include, without limitation, a wired network interface (such as a network interface card), a wireless network interface (such as a wireless network interface card), a modem, and any other suitable interface. In one embodiment, communication interface 222 provides a direct connection to a remote server via a direct link to a network, such as the Internet. Communication interface 222 may also indirectly provide such a connection through any other suitable connection.

Communication interface 222 may also represent a host adapter configured to facilitate communication between computing system 210 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like.

Communication interface 222 may also allow computing system 210 to engage in distributed or remote computing. For example, communication interface 222 may receive instructions from a remote device or send instructions to a remote device for execution. In one embodiment, communication interface can transmit user inputs from input interface 230 to the remote server and receive encoded video from the remote server representing screen images updated in response to the user inputs. Exemplary applications for this embodiment include cloud gaming, remote desktop management and wireless display (WiDi).

As illustrated in FIG. 3, computing system 210 may also include at least one display device 224 coupled to communication infrastructure 212 via a display adapter 226. Display device 224 generally represents any type or form of device capable of visually displaying information forwarded by display adapter 226. Similarly, display adapter 226 generally represents any type or form of device configured to forward graphics, text, and other data for display on display device 224.

The decoder 255 may be any device capable of decoding (decompressing) data that may be encoded (compressed). In one embodiment, the decoder 255 can be configured to decode data encoded in any protocol by encoder 180 of the application server. The display device 224 can be capable of displaying visual information received from the decoder 255. The display device 224 may be used to display visual information generated at least in part by the client device 210. However, the display device 224 may also be used to display visual information received from remote computer system 100.

As illustrated in FIG. 3, computing system 210 may also include at least one input device 228 coupled to communication infrastructure 212 via an input interface 230. Input device 228 generally represents any type or form of input device capable of providing input, either computer- or human-generated, to computing system 210. Examples of input device 228 include, without limitation, a keyboard, a pointing device, a speech recognition device, a joystick, a touch screen, a microphone or any other input device. In one embodiment, the commands entered by the user through the input device 228 can be transmitted through communication interface 222 to the computer system 100 of the application server where the application running is controlled or executed in accordance with the instructions entered through the input device 228.

As illustrated in FIG. 3, computing system 210 may also include a primary storage device 232 and an optional backup storage device 233 coupled to communication infrastructure 212 via a storage interface 234. Storage devices 232 and 233 generally represent any type or form of storage device or medium capable of storing data and/or other computer-readable instructions. For example, storage devices 232 and 233 may be a magnetic disk drive (e.g., a so-called hard drive), a floppy disk drive, a magnetic tape drive, an optical disk drive, a flash drive, or the like. Storage interface 234 generally represents any type or form of interface or device for transferring data between storage devices 232 and 233 and other components of computing system 210.

In one example, databases 240 may be stored in primary storage device 232. Databases 240 may represent portions of a single database or computing device or it may represent multiple databases or computing devices. For example, databases 240 may represent (be stored on) a portion of computing system 210, and/or portions of example network architecture 400 in FIG. 4 (below). Database 240 may also be stored on a server device implemented on computer system 100 show in FIG. 2. Alternatively, databases 240 may represent (be stored on) one or more physically separate devices capable of being accessed by a computing device, such as computing system 210 and/or portions of network architecture 400.

Continuing with reference to FIG. 3, storage devices 232 and 233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 232 and 233 may also include other similar structures or devices for allowing computer software, data, or other computer-readable instructions to be loaded into computing system 210. For example, storage devices 232 and 233 may be configured to read and write software, data, or other computer-readable information. Storage devices 232 and 233 may also be a part of computing system 210 or may be separate devices accessed through other interface systems. For example, the example embodiments disclosed herein may be encoded as a computer program (also referred to as computer software, software applications, computer-readable instructions, or computer control logic) on a computer-readable medium.

Many other devices or subsystems may be connected to computing system 210. Conversely, all of the components and devices illustrated in FIG. 3 need not be present to practice the embodiments described herein. The devices and subsystems referenced above may also be interconnected in different ways from that shown in FIG. 3. Computing system 210 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 210. All or a portion of the computer program stored on the computer-readable medium may then be stored in system memory 216 and/or various portions of storage devices 232 and 233. When executed by processor 214, a computer program loaded into computing system 210 may cause processor 214 to perform and/or be a means for performing the functions of the example embodiments described and/or illustrated herein. Additionally or alternatively, the example embodiments described and/or illustrated herein may be implemented in firmware and/or hardware.

Figure 4:
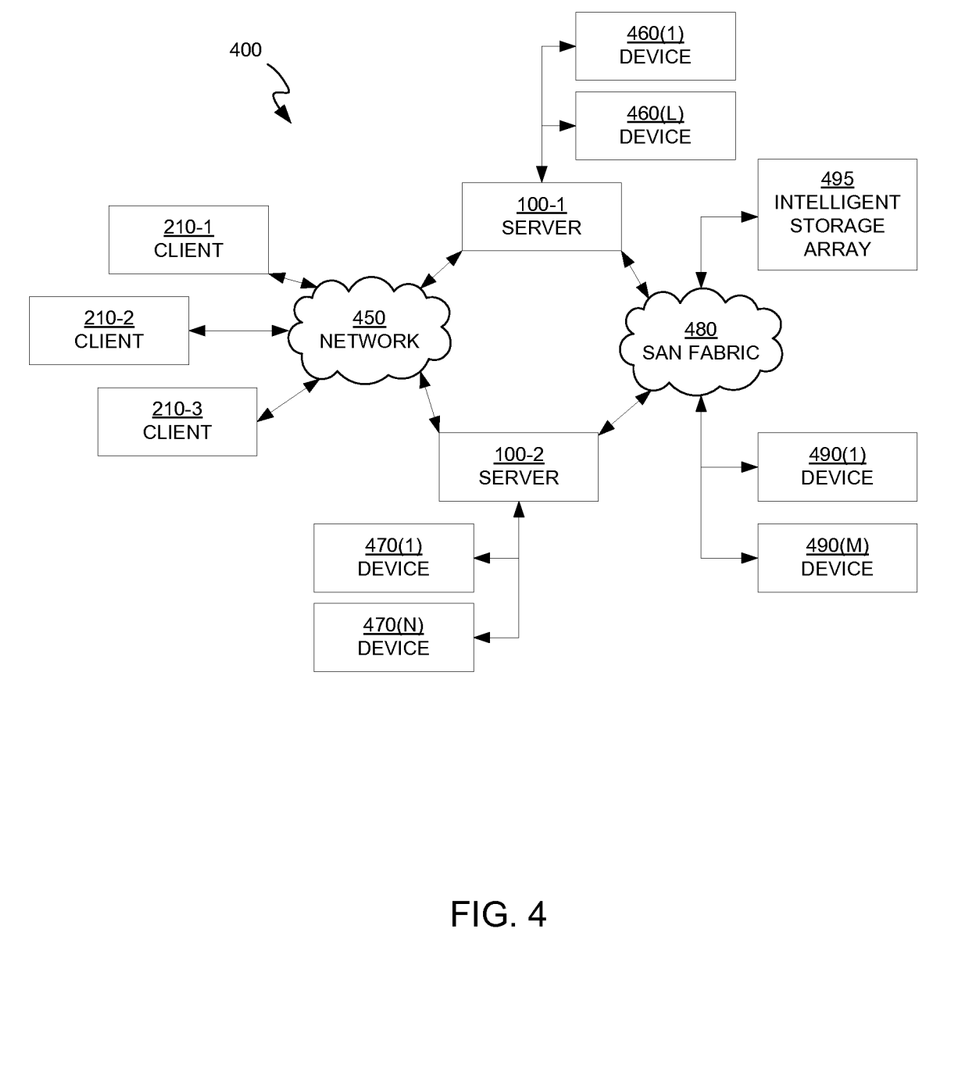
FIG. 4 is a block diagram of an example of a network architecture in which client systems and servers may be coupled to a network, according to embodiments of the present invention

FIG. 4 is a block diagram of an example of a network architecture 400 in which client systems 210-1, 210-2, and 210-3 and servers 100-1 and 100-2 may be coupled to a network 450. Client systems 210-1, 210-2, and 210-3 generally represent any type or form of computing device or system, such as computing system 210 of FIG. 2. Each of the client systems is a separate entity located remotely from the computer system 100 (e.g., they are separated from the computer system 100 by the network 450)

Similarly, servers 100-1 and 100-2 generally represent computing devices or systems, such as application servers or database servers, configured to provide various database services and/or run certain software applications. Servers 100-1 and 100-2 generally represent any type or form of computing device or system such as computing system 100 of FIG. 1. Network 450 generally represents any telecommunication or computer network including, for example, an intranet, a wide area network (WAN), a local area network (LAN), a personal area network (PAN), or the Internet.

With reference to computing system 210 of FIG. 3, a communication interface, such as communication interface 222, may be used to provide connectivity between each client system 210-1, 210-2, and 210-3 and network 450. Client systems 210-1, 210-2, and 210-3 may be able to access information on server 100-1 and 100-2 using, for example, a Web browser or other client software, such as a online gaming or cloud gaming software. Such software may allow client systems 210-1, 210-2, and 210-3 to access data hosted by server 100-1 and 100-2, storage devices 460(1)-(L), storage devices 470(1)-(N), storage devices 490 (1)-(M), or intelligent storage array 495. Although FIG. 4 depicts the use of a network (such as the Internet) for exchanging data, the embodiments described herein are not limited to the Internet or any particular network-based environment.

Returning to FIG. 4, in one embodiment, all or a portion of one or more of the example embodiments disclosed herein are encoded as a computer program and loaded onto and executed by server 100-1 and 100-2, storage devices 460(1)-(L), storage devices 470(1)-(N), storage devices 490 (1)-(M), intelligent storage array 495, or any combination thereof. All or a portion of one or more of the example embodiments disclosed herein may also be encoded as a computer program, stored in server 100-1, run by server 100-2, and distributed to client systems 210-1, 210-2, and 210-3 over network 450.

Figure 5:
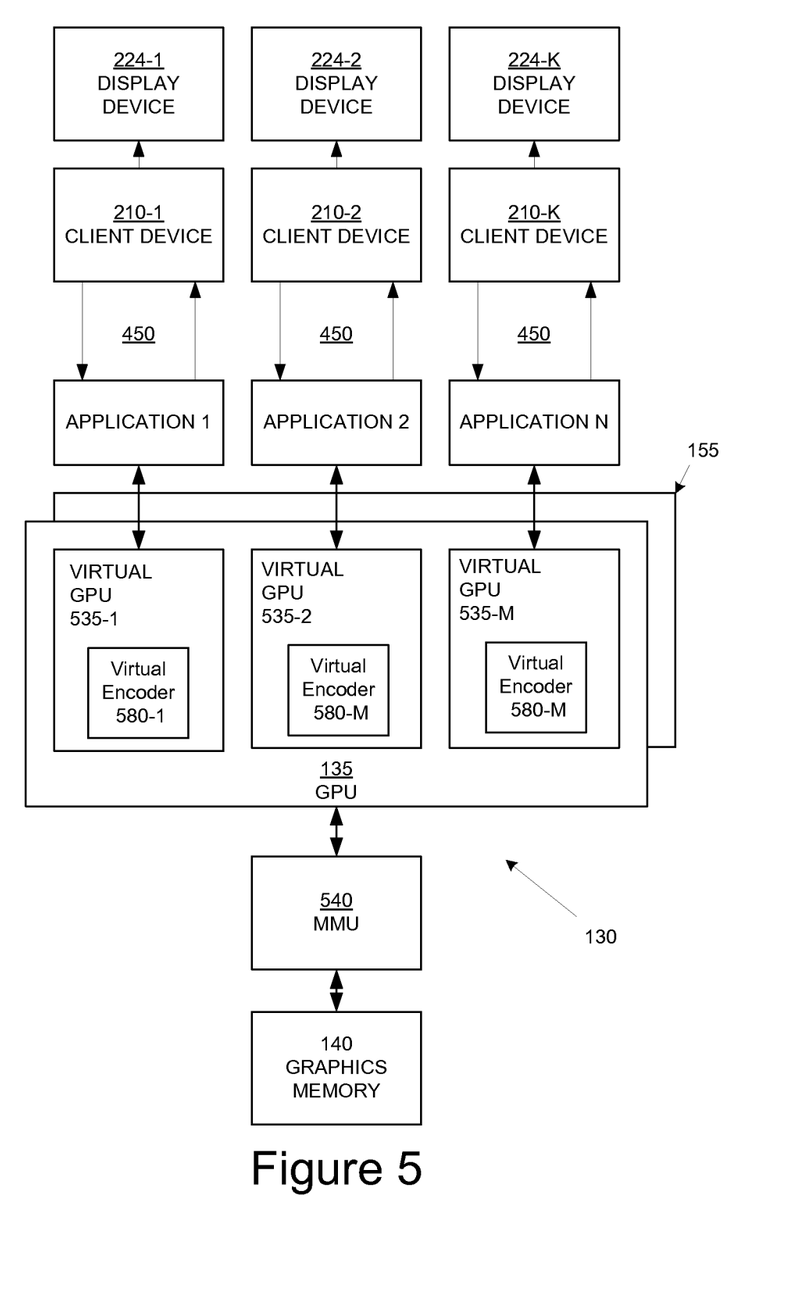
FIG. 5 illustrates an example of a graphics system upon which embodiments of the present invention may be implemented.

FIG. 5 illustrates a graphics system 130 in an embodiment according to the present invention. In the FIG. 1 embodiment, the graphics system 130 includes a physical GPU 135, although the graphics system 130 can include additional physical GPUs 155 as described above.

According to embodiments of the present invention, the physical GPU 135 is configured for concurrent use by a number N of applications 1, 2, ..., N. More specifically, the physical GPU 135 is configured as a number M of virtual GPUs 535-1, 535-2, ..., 535-M that are concurrently used by the applications 1, 2, ..., N. Virtual encoders 580-1, 580-2, ..., 580-M are implemented within the virtual GPUs. Each of the additional GPUs 155 may be similarly configured as multiple virtual GPUs. In one embodiment, the GPU 135 and the additional GPUs 155 are coupled to a memory management unit 540 (MMU; e.g., an input/output MMU) that is in turn coupled to graphics memory 140, described in conjunction with FIG. 1.

In one embodiment, the applications 1, 2, ..., N are video game applications; however, the invention is not so limited. That is, the applications 1, 2, ..., N can be any type of application. For example, the application may be a programming guide that provides, in table form, a list of the various programs that are available on different television channels in different time slots, and the client device may be a set top box (cable or satellite).

Significantly, with reference also to FIG. 5, the displays 224-1, 224-2, ..., 224-K of the client devices 210-1, 210-2, ..., 210-K are remote displays relative to the computer system 100. That is, the displays 224-1, 224-2, ..., 224-K are not directly connected to the computer system 100 via, for example, a low voltage display signal (LVDS) interface. Instead, the displays 224-1, 224-2, ..., 224-K are accessible to the computer system 100 only via the respective client device 210-1, 210-2, ..., 210-K (also see FIG. 6).

In operation, in one embodiment, the client devices 210-1, 210-2, ..., 210-K provide control information (e.g., user inputs) to the computer system 100 over the network 450. Responsive to the control information, with reference also to FIG. 5, the computer system 100 executes the applications 1, 2, ..., N to generate output data, which is transmitted to the client devices 210-1, 210-2, ..., 210-K via the network 350. The video output data is encoded.

In one embodiment, the client devices 210-1, 210-2, ..., 210-K can be stateless in the sense that the applications 1, 2, ..., N are not installed on them. Instead, the client devices 210-1, 210-2, ..., 210-K rely on the computer system 100 to store and execute the applications 1, 2, ..., N.

More specifically, in one embodiment, the client device 210-1 provides control information for application 1 to the computer system 100 over the network 450. In parallel, the client device 210-2 provides control information for application 2 to the computer system 100 over the network 450. The applications 1 and 2 may be the same application (e.g., they may be instances or copies of the same video game), or they may be different applications.

In response to the inputs from the client device 210-1, the virtual GPU 535-1 is utilized by the application 1 to generate display data (output data) related to the application 1. The display data related to application 1 is sent to the client device 210-1 over the network 450. In parallel, in response to the inputs from the client device 210-2, the virtual GPU 535-2 is utilized by the application 2 to generate display data (output data) related to the application 2. The display data related to application 2 is sent to the client device 210-2 over the network 450. The display data can be encoded according to principles disclosed herein.

Figure 6:
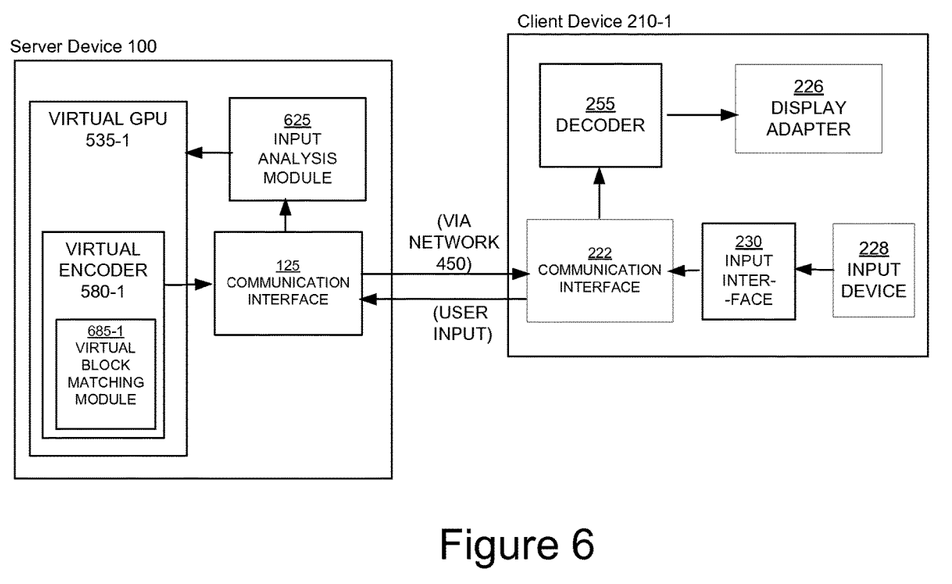
FIG. 6 is a block diagram illustrating the flow of data from the client device to the server device in an embodiment according to the present invention.

FIG. 6 is a block diagram illustrating the flow of data, for example, from the client device 210-1 to the server device 100 in an embodiment according to the present invention. In the FIG. 6 example, the user inputs data into input device 228. The input data passes through input interface 230 before it is transmitted over network 450 to the server device 100 through communication interface 222. In one embodiment where the client device is a thin client such as a basic user terminal or television, the inputs are generated at the server device 100 directly and input interface 230 and input device 228 are optional.

At the server end, the data is received through communication interface 125. The input analysis module 625 is used to analyze the input to determine the type of user input device and to determine the input value according to the type of input device.

The input analysis module transmits the results of its analysis to the virtual GPU 535-1. In one embodiment, the system can be implemented as a standalone GPU similar to GPU 135 described in FIG. 1. Similar to the GPU it is implemented within, the encoder does not necessarily need to be a virtual encoder for the purposes of this invention. The encoder can be configured similar to encoder 180 shown in FIG. 1.

The virtual encoder 580-1 implemented within virtual GPU 535-1 uses the results from the input analysis module 625 to encode video frames from the application being executed on server device 100. Virtual encoder 580-1 uses virtual block matching module 685-1 to find matching macroblocks within a reference frame. Virtual block matching module 685-1 can also be implemented within the encoder module as a standalone block matching module 185 as shown in FIG. 2. The encoded video frames are transmitted through communication interface 125 to client device 210-1.

At client device 210-1 the encoded video frames are communicated by communication interface 222 to decoder 255. The decoder decodes the encoded video frames and transmits the results to the display adapter 226.

Figure 7:
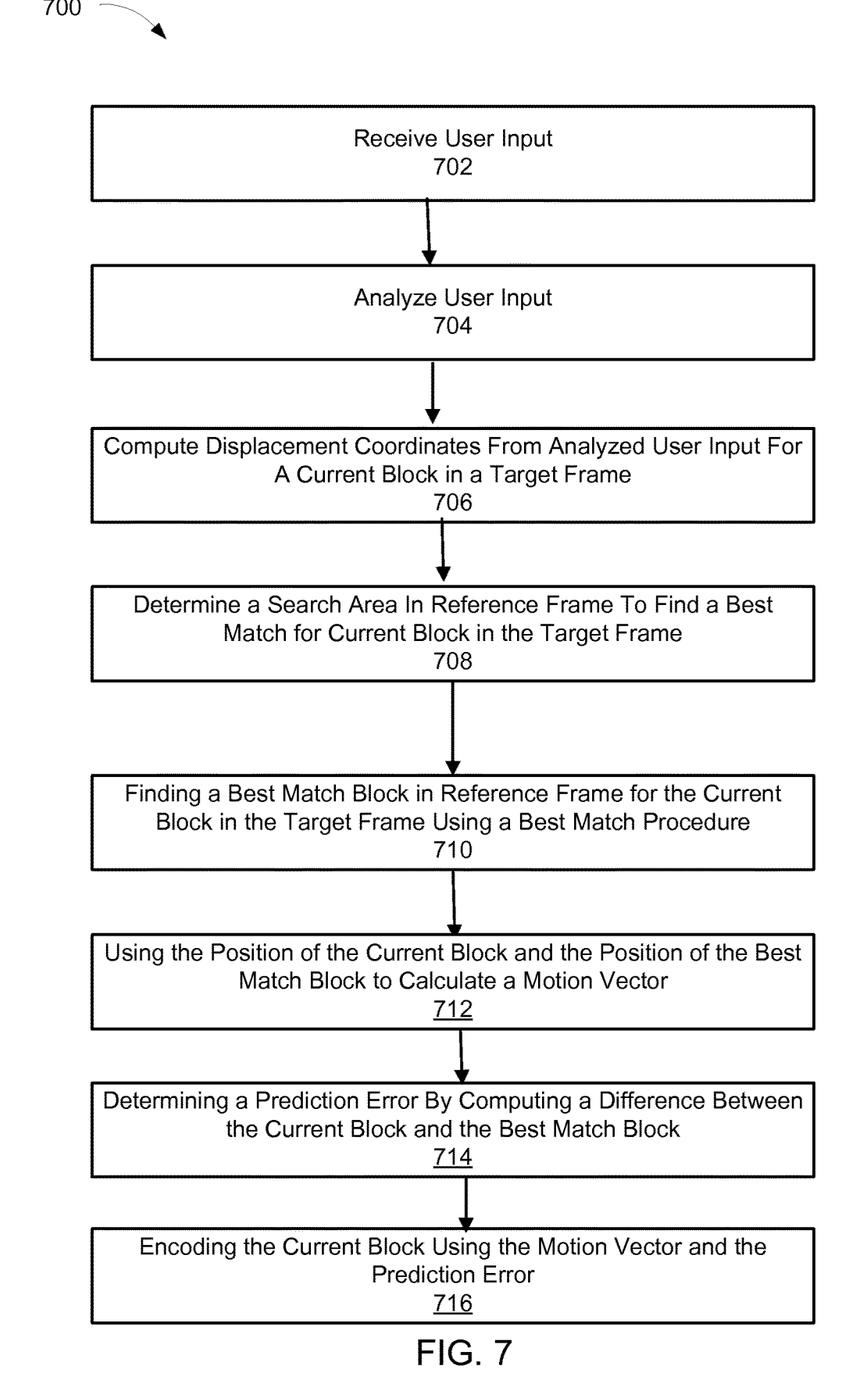
FIG. 7 is a flowchart of an example of a computer-implemented method for finding a best match block in a reference frame in an embodiment according to the present invention.

FIG. 7 depicts a flowchart 700 of an exemplary process flowchart of a computer-implemented method for finding a best match block in a reference frame in an embodiment according to the present invention. The invention, however, is not limited to the description provided by flowchart 700. Rather, it will be apparent to persons skilled in the relevant art(s) from the teachings provided herein that other functional flows are within the scope and spirit of the present invention.

Flowchart 700 will be described with continued reference to exemplary embodiments described above in reference to FIGS. 2, 3, 4, 5, and 6, though the method is not limited to those embodiments.

At block 702 of FIG. 7, user input is accessed or received from an end user device (e.g., the client devices 210-1, 210-2, . . . , 210-K). The inputs are received at a centralized server device (e.g., the computer system 100) having a GPU (e.g., the GPU 135) configured either as a standalone GPU or for concurrent use by multiple applications (the applications 1, 2, . . . , N) executing in parallel. That is, the GPU can be implemented as multiple virtual GPUs (the virtual GPUs 535-1, 535-2, . . . , 535-M) in one embodiment.

At block 704, the input analysis module 625 analyses the user input received. The analysis module first determines whether the input is associated with any type of screen update. If the user input will not result in any screen update, then the input analysis module can ignore the user input as it will play no role in encoding the video frames to be transmitted to a client device 210-1. In this case, the block matching will be conducted according to conventional techniques and procedures.

The input analysis module will then analyze the input to determine the type of user input device and to determine the input value according to the type of input device. For example, in order to determine the direction and extent of screen update or on-screen motion, the input analysis module needs to know whether the input is from a game console, joystick, keyboard, microphone, touch screen display or a mouse, for instance. Subsequent to figuring out the type of input device, the analysis module needs to convert the values inputted by the user into a common unit of measurement that can be easily evaluated by the graphics processing unit. Further, because the user input can be a continuous one meant to update the screen over the course of several video frames, the input analysis module will need to transform that transient input information into a format such that a single input value can be ascribed to each of the frames.

The input analysis module 625 then forwards the frame specific values indicating the location, magnitude and direction of on-screen displacement of the frames over to the graphics processing unit 535-1. Because the analyzed user input received from the input analysis module 625 can be provided in common units of measurement, agnostic of the type of user input device, the encoder 580-1 of the graphics processing unit 535-1 does not need to translate the data to any other format.

At block 706, the process of encoding this stream of video data begins. After encoding all the pixels in the reference frames of the video stream, the encoder begins to encode the P and the B frames. The encoder accesses these frames from graphics memory 140. Graphics memory 140 is used to store the stream of video data corresponding the application running on server device 100 and controlled by user inputs from client device 210-1, or user inputs from user input module 120 on the server side where the client device is only a thin client. The stream of video data is generated by virtual graphics processing unit 535-1 before its stored in graphics memory 140. The encoder 580-1 accesses the video stream from graphics memory 140 and correlates the sequence of analyzed user input values received from input analysis module 625 with the corresponding sequence of video frames.

In order to encode the macroblocks in the P and B frames, the encoder needs to find matching blocks in the reference frame for each of the macroblocks. Using the analyzed user input, the encoder calculates a displacement vector (or displacement coordinates) for a respective current block in a target P or B frame.

Figure 8:
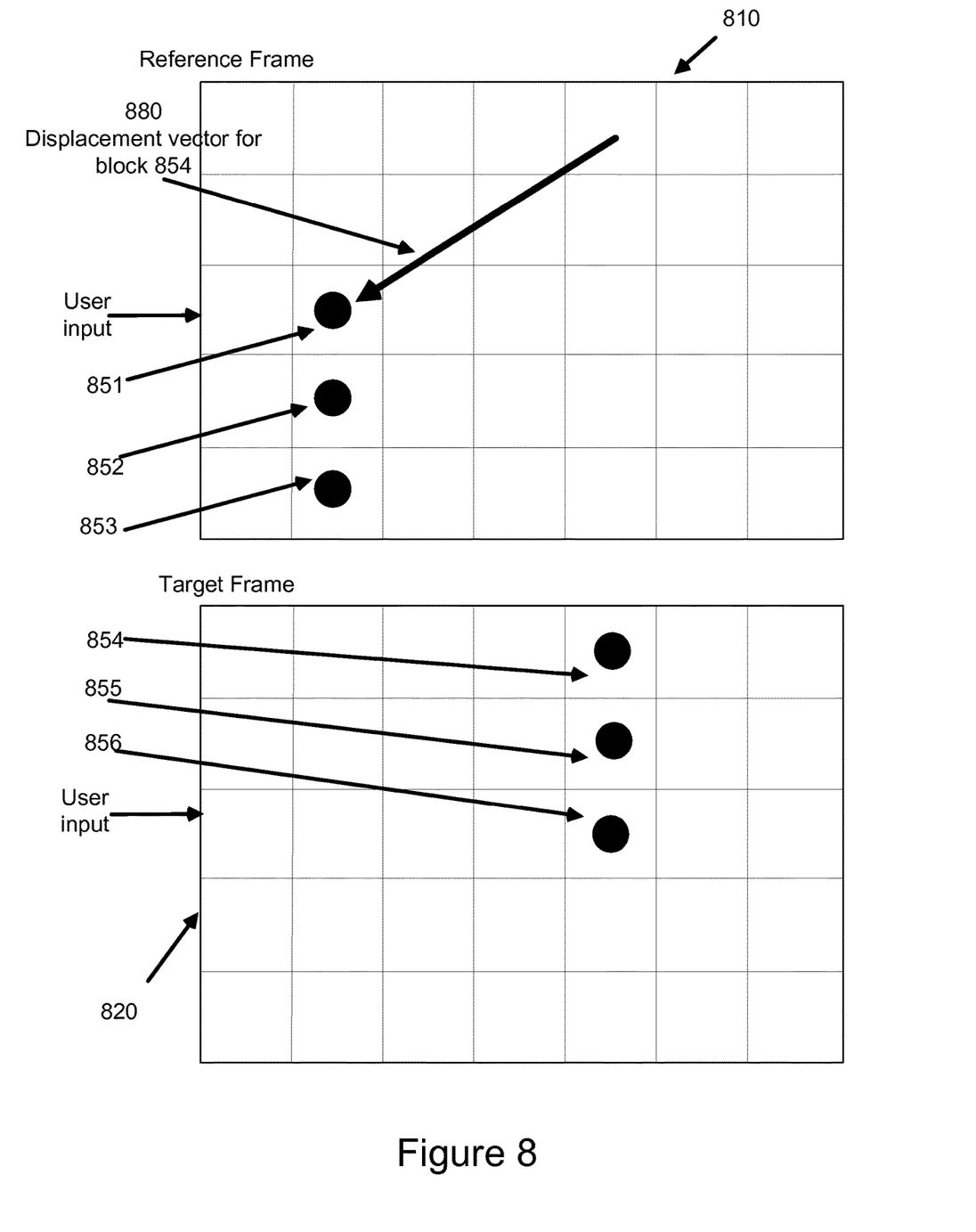
FIG. 8 is a simplified diagram illustrating an exemplary method of determining displacement vectors for macroblocks in a target frame according to an embodiment of the present invention.

The determination of a displacement vector can be illustrated with reference to FIG. 8, which is a simplified diagram illustrating an exemplary method of determining displacement vectors for macroblocks in a target frame 820 in relation to a reference frame 810 according to an embodiment of the present invention. Using the analyzed input values from the input analysis module 625, the encoder determines that user input has shifted macroblock 854 by approximately three units to the right and two units to the top in relation to the reference frame and thus can calculate a displacement vector $\{(-3, -2)\}$ for macroblock 854. This displacement vector directs the encoder to the general search area of macroblock 851 in reference frame 810 to find the best match block.

In one embodiment, the encoder 580-1 uses the displacement vector or displacement coordinates determined for the current block as the displacement vector for all the macroblocks in the P or B frame (e.g. macroblocks 855 and 856) under the assumption that the user input intended to displace all pixels of the current frame in the same direction and to the same extent. This allows all the macroblocks in the P or B frame to benefit from the determination of the same displacement vector and no further computation is required for the remaining macroblocks in a target frame.

In another embodiment, however, the displacement vector would have to be recomputed for each of the macroblocks for a given input. For example, in a video game, a user input may cause both the foreground and background images to change in different ways or directions, in which case the displacement vectors for macroblocks in the foreground and background would be different and would have to be computed independently of each other.

As explained above, at block 708, encoder 580-1 uses the displacement vector (or displacement coordinates) as a cue to determine a search area in the reference frame to find a best match for the current block in the reference frame.

At block 710, the block matching module 185 of the encoder finds the best match block in the reference frame by using one of the following well-known best match procedures: full search, cross search, spiral search, three step search, four step search, orthogonal search, hierarchical search and diamond search.

The displacement vector based on user input calculated in accordance with the principles of this invention, in some instances, may not be precise enough to enable encoder 580-1 to find the best match block. However, it is much more advantageous than conventional techniques in the sense that it provides a strong cue or hint to the encoder regarding the general search area or location in a frame to look for the best match block. Without the cue based on user input, conventional systems waste precious time starting to look for the best match block at or around the same position in the reference frame as the location of the current block within the target frame. In other instances, where the user input is a simple function such as moving a window in a remote desktop environment, the displacement vector calculated can be very accurate in predicting the location of the best match macroblock.

At block 712, the encoder calculates a motion vector using the position of the best match block and the position of the current block.

At block 714, encoder then determines a prediction error by computing the differences between the current block and the best match block.

Finally at block 716, the encoder has the motion vector and the prediction error necessary to encode the current block.

After encoding the target frame, in one embodiment, the target frame can be transmitted over to client device 210-1 where the decoder will then use the reference frame along with the motion vector and prediction errors for the P and B frames to recover the inter-frames.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method comprising:
receiving input data representative of a user based input using an input device;
determining, based at least in part on the input data, that the user based input is associated with altering data rendered for display;
based at least in part on the user based input being associated with altering the data, analyzing the input data to determine a type of input device and an input value corresponding to the type of input device;
converting the input value to a device agnostic input value;
associating the device agnostic input value with a target frame of a video stream;
computing, based at least in part on the device agnostic input value, displacement coordinates for a current block within the target frame of the video stream with respect to a reference frame of the video stream;
executing a search, within the reference frame, for a best match block corresponding to the current block within the target frame, the search beginning at an initial search location determined using the displacement coordinates; and
responsive to identifying the best match block, determining a prediction error based at least in part on computing a difference between the current block within the target frame and the best match block within the reference frame.

2. The method of claim 1, wherein the executing the search includes using a block matching procedure.

3. The method of claim 2, wherein the block matching procedure includes at least one of: full search, cross search, spiral search, three step search, four step search, orthogonal search, hierarchical search, or diamond search.

4. The method of claim 2, further comprising:
calculating a motion vector for the current block using a first position of the current block and a second position of the best match block; and
encoding the current block based at least in part on the motion vector and the prediction error to generate an encoded current block.

5. The method of claim 4, further comprising:
transmitting the encoded current block to a remote computer for decoding the motion vector and the prediction error to recover the current block.

6. The method of claim 1, wherein the converting the input value to the device agnostic input value is based at least in part on the type of input device.

7. The method of claim 1, wherein the receiving the input data comprises receiving the input data over a communication interface from a remote computer.

8. The method of claim 1, wherein the analyzing the input data to determine the type of input device comprises determining whether the type of input device includes at least one of a keyboard, a mouse, a joystick, a touch screen, or a microphone.

9. The method of claim 1, further comprising generating the video stream using a virtual graphics processing unit (vGPU).

10. An apparatus comprising:
a receiver operable to receive input data representative of a user based input using an input device;
an input analysis module operable to:
determine, based at least in part on the input data, that the user based input is associated with altering data rendered for display;
based at least in part on the user based input being associated with altering the data, analyze the input data to determine a type of input device and an input value corresponding to the type of input device;
convert the input value to a device agnostic input value; and
associate the device agnostic input value with a target frame of a video stream; and
an encoder module operable to:
compute, based at least in part on the device agnostic input value, displacement coordinates for a current block within the target frame of the video stream with respect to a reference frame of the video stream;
execute a search, within the reference frame, for a best match block corresponding to the current block within the target frame, the search beginning at an initial location determined using the displacement coordinates; and
responsive to identifying the best match block, determining a prediction error based at least in part on computing a difference between the current block within the target frame and the best match block within the reference frame.

11. The apparatus of claim 10, wherein the executing the search includes using a block matching procedure.

12. The apparatus of claim 11, wherein the block matching procedure includes at least one of: full search, cross search, spiral search, three step search, four step search, orthogonal search, hierarchical search, or diamond search.

13. The apparatus of claim 11, wherein the encoder module is further operable to:
calculate a motion vector for the current block using a first position of the current block and a second position of the best match block; and
encode the current block based at least in part on the motion vector and the prediction error to generate an encoded current block.

14. The apparatus of claim 13, further comprising a transmitter operable to transmit said encoded current block to a remote computer for decoding thereof.

15. The apparatus of claim 10, wherein the encoder module is implemented within a virtual graphics processing unit (vGPU).

16. The apparatus of claim 10, further comprising a stream generator operable to generate the video stream using a virtual graphics processing unit (vGPU).

17. The apparatus of claim 10, wherein the converting the input value to the device agnostic input value is based at least in part on the type of input device.

18. The apparatus of claim 10, wherein the analyzing the input data to determine the type of input device comprises determining whether the type of input device includes at least one of a keyboard, a mouse, a joystick, a touch screen, or a microphone.

19. A computer system comprising:
one or more processors;
a graphics processing system coupled to the one or more processors and comprising a graphics processing unit (GPU) operable as a plurality of virtual GPUs for use by a plurality of instances of an application executing in parallel;
a communication interface operable for sending and receiving data; and
memory coupled to the graphics processing system and having stored therein instructions that, if executed by the computer system, cause the computer system to execute operations comprising:

receiving, from a remote client device via the communication interface, input data representative of a user input associated with an instance of the application of the plurality of instances of the application;

determining, based at least in part on the input data, that the user input is associated with altering data rendered for display;

based at least in part on the user input being associated with altering the data, analyzing the input data to determine a type of input device and an input value corresponding to the type of input device;

converting the input value to a device agnostic input value;

associating the device agnostic input value with a target frame of a video stream;

generating, based at least in part on the device agnostic input value, displacement coordinates for a current block within the target frame of the video stream with respect to a reference frame of the video stream;

executing a search, within the reference frame, for a best match block corresponding to the current block within the target frame, the search beginning at an initial search location determined using the displacement coordinates; and responsive to identifying the best match block, determining a prediction error based at least in part on computing a difference between the current block within the target frame and the best match block within the reference frame.

20. The computer system of claim 19, wherein the operations further comprise:

calculating a motion vector for the current block using a first position of the current block and a second position of the best match block; and encoding the target frame using the motion vector and the prediction error to generate, at least in part, an encoded target frame.

21. The computer system of claim 20, wherein the operations further comprise sending the encoded target frame to the client device for decoding thereof.

22. The computer system of claim 19, wherein the operations further comprise:

receiving, from another remote client device via the communication interface, other input data representative of another user input associated with another instance of the application of the plurality of instances of the application;

generating other displacement coordinates for another current block in the target frame of the video stream corresponding to the another instance of the application and based at least in part on an analysis of the another user input;

executing another search, within the reference frame, for another best match block corresponding to the another current block within the target frame, the another search beginning at another initial search location determined using the other displacement coordinates; and responsive to identifying the another best match block, determining another prediction error based at least in part on computing another difference between the another current block within the target frame and the another best match block within the reference frame.

\* \* \* \* \*